United States Patent [19]
Konig et al.

[11] Patent Number: 6,058,797
[45] Date of Patent: May 9, 2000

[54] CLIP-ON SHIFTER KNOB

[75] Inventors: Henning Konig, Dassel, Germany; Stephen McCoy, Millbrook, United Kingdom

[73] Assignee: Teleflex Incorporated, Plymouth Meeting, Pa.

[21] Appl. No.: 09/198,428

[22] Filed: Nov. 24, 1998

[51] Int. Cl.[7] ................................................. G05G 1/06
[52] U.S. Cl. ........................ 74/523; 74/473.34; 16/436
[58] Field of Search ............................ 74/523, 543, 553, 74/551.9, 473.3, 473.34, 473.35, 552; 16/436, 431, 441, DIG. 41, DIG. 12, DIG. 18, DIG. 19; 403/326, 329, 354

[56] References Cited

U.S. PATENT DOCUMENTS

| | | | |
|---|---|---|---|
| 2,174,504 | 9/1939 | Cole | 74/473.34 |
| 2,567,727 | 9/1951 | Quackenbush | 403/326 |
| 3,064,494 | 11/1962 | Brewster | 403/354 |
| 3,256,031 | 6/1966 | Fillweber | 403/326 |
| 3,795,156 | 3/1974 | Neuscheler | 74/543 |
| 4,724,718 | 2/1988 | Foggini | 74/543 |
| 4,791,826 | 12/1988 | Behrens | 74/543 |
| 4,807,490 | 2/1989 | Foggini | 74/543 |
| 4,893,392 | 1/1990 | Stricker et al. | 16/441 |
| 4,896,556 | 1/1990 | Takada | 74/553 |
| 5,261,665 | 11/1993 | Downey | 74/551.9 |
| 5,284,400 | 2/1994 | Thomas | 74/553 |
| 5,588,329 | 12/1996 | Nedachi | 74/543 |
| 5,740,586 | 4/1998 | Gomas | 16/436 |

FOREIGN PATENT DOCUMENTS

| | | | |
|---|---|---|---|
| 1951684 | 4/1971 | Germany | 74/523 |
| 1965032 | 7/1971 | Germany | 74/523 |
| 4040955 | 1/1992 | Germany | 74/523 |
| 2-108109 | 4/1990 | Japan | 74/523 |

*Primary Examiner*—David A. Bucci
*Assistant Examiner*—Chong H. Kim
*Attorney, Agent, or Firm*—Howard & Howard

[57] ABSTRACT

A shifter for a vehicle transmission wherein a connector cap (14) consisting of an organic polymeric material is molded about the top end of a shifter lever (12) having a top end and a bottom end to define a first snap-on bead (16) for receiving and mechanically retaining a shifter knob (18). A fulcrum support (26) is molded on the lever (12) simultaneously with and spaced from the connector cap (14) closer to the bottom end of the lever (12) and of the same organic polymeric material as the connector cap (14). The shifter knob (18) comprises a retainer sleeve (34) consisting of organic polymeric material and a bulbous bulb (36) molded about the sleeve (34). The sleeve (34) has an inner cylindrical surface and an open sleeve bottom and a closed sleeve top (40) for disposition over the connector cap (14). A complementary tongue (24) extends downwardly from the interior of the sleeve top (40) for mechanically engaging a groove (24) in the connector cap (14). The sleeve (34) includes slots (52 and 54) defining cantilevered tabs (56) which are flexible and extend to distal ends, a second bead (50) being disposed at the distal ends of the tabs (56) for snapping over the first bead (16).

24 Claims, 2 Drawing Sheets

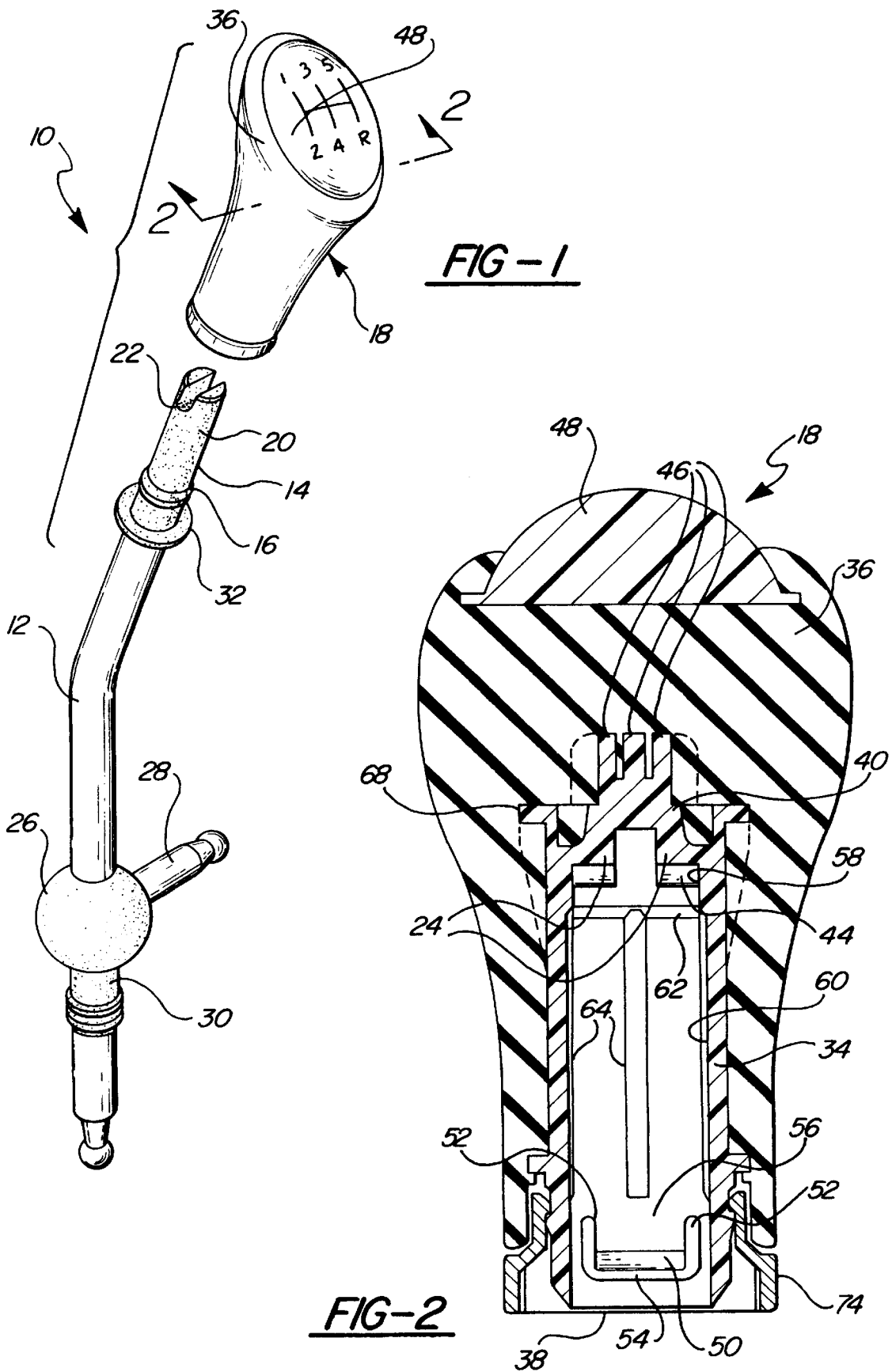

CLIP-ON SHIFTER KNOB

BACKGROUND OF THE INVENTION

1. Field of the Invention

A shift lever for shifting a transmission in an automotive vehicle.

2. Description of the Prior Art

As is well known, shifter levers have a knob on the top end for manual grasping in shifting the transmission of the vehicle. In some instances, the end of the lever is knurled and the knob is separately made of organic polymeric or plastic material and forced onto the knurled portion in a friction fit. Alternatively, the knob may be molded directly on the lever. However, in many instances, it is desirable to place the knob on the lever late in the vehicle assembly process and to select the knob from a variety of knob designs. This has been accomplished by machining a metal part and placing it on the top end of the lever, the part being machined in a special configuration to receive a knob.

SUMMARY OF THE INVENTION AND ADVANTAGES

A shifter for a vehicle transmission wherein a connector cap consisting of an organic polymeric material is molded about the top end of a shifter lever having a top end and a bottom end to define a first snap-on for receiving and mechanically retaining a shifter knob. The connector cap presents a first snap-on for receiving and mechanically retaining a shifter knob.

Accordingly, significant saving can be attained by the subject invention as the requirement for special and relatively expensive machining is eliminated and closer and consistent tolerances are attained in the molding of a plastic connector cap on the top end of the shift lever. The post machining treatments, such as deburring, are also eliminated.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an exploded perspective view;

FIG. 2 is an enlarged cross sectional view of the shifter knob;

DETAILED DESCRIPTION OF THE PREFERRED EMBODIMENT

Figure 3:
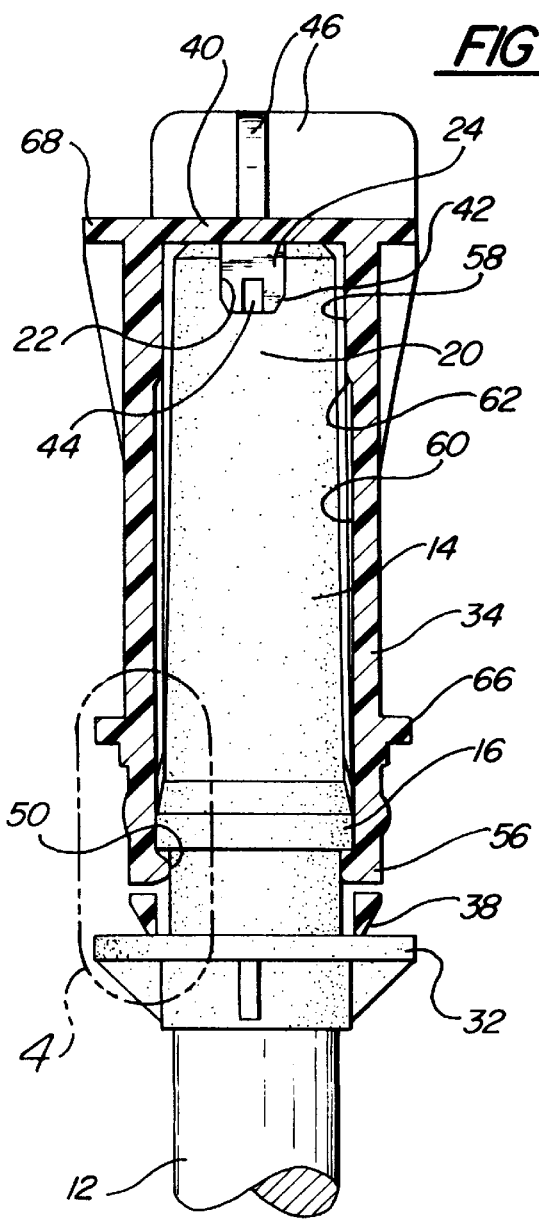
FIG. 3 is an enlarged fragmentary view partially in cross section of the sleeve on the lever.
Figure 4:
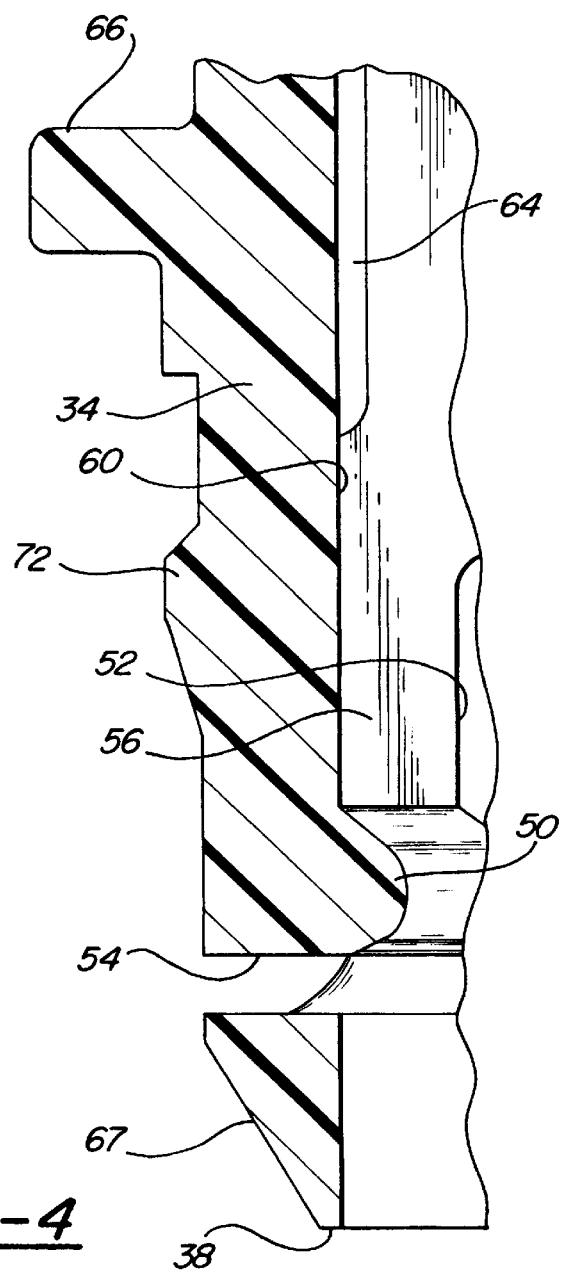
FIG. 4 is an enlarged fragmentary view of the portion in the designated ellipse of FIG. 3.

Referring to the Figures, wherein like numerals indicate like or corresponding parts throughout the several views, a shifter for a vehicle transmission is generally shown at 10.

A shifter lever 12 consists of metal and has a top end and a bottom end and is characterized by a connector cap 14 consisting of an organic polymeric material, i.e., plastic, molded about the top end and including a first snap-on, in the form of an annular bead 16, for receiving and mechanically retaining a shifter knob, generally indicated at 18. The connector cap 14 includes a closed upper end 20 disposed over the top end of the lever 12. A groove 22 of a tongue and groove means is disposed at the upper end 20 for coacting with a complementary tongue 24 of a tongue and groove means on the shifter knob 18 to prevent rotation of a shifter knob 18 once snapped into engagement therewith. The groove 22 extends diametrically across the upper end 20 for receiving the tongue 24 on the shifter knob 18.

The first snap-on 16 is spaced from the upper end 20 of the connector cap 14 for snapping into engagement with and mechanically retaining the shifter knob 18. The first snap-on 16 comprises an annular bead which extends angularly or circumferentially about the circumference of the connector cap 14.

A fulcrum support 26 is disposed on the lever 12 and is spaced from the connector cap 14 closer to the bottom end of the lever 12. The fulcrum support 26 consists of organic polymeric material and, more specifically, the connector cap 14 and the fulcrum support 26 consist of the same organic polymeric material to facilitate simultaneous molding thereof on the lever 12. The fulcrum support 26 includes a spherical ball and an arm 28 extends laterally from the spherical ball. A skirt 30 is also molded of organic polymeric material in a cylindrical form below the spherical ball.

The connector cap 14 also includes a boot retainer 32 for retaining a flexible boot (not shown) surrounding the lever 12.

The shifter knob 18 comprises a retainer sleeve 34 consisting of organic polymeric material and a bulbous bulb 36 is disposed about the sleeve 34. The sleeve 34 has an inner cylindrical surface and an open sleeve bottom 38 and a closed sleeve top 40 for disposition over the connector cap 14. The closed sleeve top 40 having an interior and an exterior and the tongue 24 of the complementary tongue and groove means is disposed on the interior of the sleeve top 40 for mechanically engaging the groove 22 in the connector cap 14. The groove 22 extends diametrically across the upper end 20 and the tongue 24 projects downwardly from and extends diametrically across the interior of the sleeve top 40. The tongue 24 presents a tapered distal end 42 for facilitating insertion into the groove 22. The tongue 24 includes a relief 44 for allowing radially inward compression in response to insertion into the groove 22.

An anti-rotation projection in the form of crossed flanges 46 are disposed on the exterior of the sleeve top 40. The bulbous knob 36 is foamed about the sleeve 34 and the flanges 46 prevent rotation of the bulbous knob 36. A decorative insert 48 is embedded in the bulbous knob 36 and serves as an indicator.

The retainer sleeve 34 includes a second snap-on 50, in the form of a second bead, for snapping into mechanical interlocking engagement with the first snap-on 16. The second bead 50 extends inwardly on the interior of the sleeve 34.

The sleeve 34 includes slots 52, 54 defining cantilevered tabs 56 which are flexible and extend to distal ends, the second bead 50 being disposed at the distal ends of the tabs 56 for snapping over the first bead 16. The slots 52, 54 extend circumferentially 54 to define the distal ends of the tabs 56 and axially 52 to define sides of the tabs 56.

The inner cylindrical surface of the sleeve 34 has a small diameter 58 adjacent the closed sleeve top 40 and a larger large diameter 60 from the sleeve bottom to the small diameter 58. A chamfer 62 is disposed between the small 58 and large 60 diameters to facilitate movement of the connector cap 14 into the small diameter 58. A plurality of ribs 64 extending axially along the large diameter 60 for fictionally engaging the connector cap 14. The ribs 64 terminate short of the axial slots 52 defining the tabs 56. The sleeve bottom is conical below the circumferential slots 54, i.e., tapered 67 inwardly from the circumferential slots 54 to the sleeve bottom 38.

A top flange 68 extends radially about the sleeve 34 adjacent the sleeve top 40 and a tool flange 66 extending radially about the sleeve below the top flange 68. The tool flange 66 is formed, mainly, as a result of the configuration of the tooling.

The sleeve 34 presents a shoulder 72 for receiving a cosmetic or decorative part 74 which includes a mating and coacting shoulder for snapping onto the sleeve 34.

The invention, therefore, includes an improved method of fabricating a shifter for a vehicle transmission comprising the steps of molding a connector cap 14 consisting of an organic polymeric material about the top end of a shifter lever 12 having a top end and a bottom end to define a first snap-on 16 for receiving and mechanically retaining a shifter knob 18. The method may be more specifically defined as simultaneously molding a fulcrum support 26 on the lever 12 spaced from the connector cap 14 closer to the bottom end of the lever 12 and of the same organic polymeric material as the connector cap 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shifter for a vehicle transmission comprising;

a shifter lever (12) having a top end and a bottom end, a connector cap (14) consisting of an organic polymeric material molded about said top end and including an upper end (20) disposed over said top end of said lever (12) and a groove (22) extending diametrically across and axially into said upper end (20) a shifter knob (18) comprising a retainer sleeve (34) consisting of organic polymeric material and a bulbous bulb (36) disposed about said sleeve (34), said sleeve (34) having an inner cylindrical surface and an open sleeve bottom and a closed sleeve top (40) for disposition over said connector cap (14), said closed sleeve top (40) having an interior and an exterior and a tongue (24) projecting, axially downwardly from and extending diametrically across said interior of said sleeve top (40) and presenting, a tapered distal end (41) for facilitating axial insertion into said groove (22) to prevent rotation of a shifter knob (18) once snapped into engagement therewith a first snap-on (16) for receiving and mechanically retaining said shifter knob.

2. An assembly as set forth in claim 1 wherein said first snap-on (16) is spaced from said upper end (20) for snapping into engagement with and mechanically retaining a shifter knob (18).

3. An assembly as set forth in claim 2 wherein said tongue and groove means comprises a groove (22) extending diametrically across said upper end (20) for receiving a tongue (24) on the shifter knob (18).

4. An assembly as set forth in claim 3 wherein said first snap-on (16) comprises an annular bead extending about the circumference of said connector cap (14).

5. An assembly as set forth in claim 2 including a fulcrum support (26) on said lever (12) spaced from said connector cap (14) closer to said bottom end of said lever (12).

6. An assembly as set forth in claim 5 wherein said fulcrum support (26) consists of organic polymeric material.

7. An assembly as set forth in claim 6 wherein said connector cap (14) and said fulcrum support (26) consist of the same organic polymeric material to facilitate simultaneous molding thereof on said lever (12).

8. An assembly as set forth in claim 7 wherein said lever (12) consists of metal.

9. An assembly as set forth in claim 7 wherein said fulcrum support (26) includes a spherical ball and an arm (28) extends laterally from said spherical ball.

10. An assembly as set forth in claim 2 wherein said connector cap (14) includes a boot retainer (32) for retaining a flexible boot surrounding said lever (12).

11. An assembly as set forth in claim 1 wherein said tongue (24) includes a relief (44) for allowing radially inward compression in response to insertion into said groove (22).

12. An assembly as set forth in claim 1 including an anti-rotation projection on said exterior of said sleeve top (40).

13. An assembly as set forth in claim 1 wherein said retainer sleeve (34) includes a second snap-on (50) for snapping into mechanical interlocking engagement with said first snap-on (16).

14. An assembly as set forth in claim 13 wherein said first snap-on (16) comprises a first bead on said connector cap (14) and said second snap-on (50) comprises a second bead extending inwardly on the interior of said sleeve (34).

15. An assembly as set forth in claim 14 wherein said sleeve (34) includes slots (52, 54) defining cantilevered tabs (56) which are flexible and extend to distal ends, said second bead being disposed at said distal ends of said tabs (56) for snapping over said first bead.

16. An assembly as set forth in claim 15 wherein said slots (52, 54) extend circumferentially (54) to define said distal ends of said tabs (56) and axially (52) to define sides of said tabs (56).

17. An assembly as set forth in claim 16 wherein said cylindrical surface has a small diameter (58) adjacent said closed sleeve top (40) and a larger large diameter (60) from said sleeve bottom to said smaller diameter (58).

18. An assembly as set forth in claim 17 including a chamfer (62) between said small (58) and large (60) diameters to facilitate movement of said connector cap (14) into said small diameter (58).

19. An assembly as set forth in claim 17 including a plurality of ribs (64) extending axially along said large diameter (60) for fictionally engaging said connector cap (14).

20. An assembly as set forth in claim 19 wherein said ribs (64) terminate short of said axial slots (52) defining said tabs (56).

21. An assembly as set forth in claim 17 including a flange extending radially about said sleeve (34).

22. An assembly as set forth in claim 17 wherein said sleeve bottom is conical.

23. An assembly as set forth in claim 17 wherein said sleeve bottom is conical below said circumferential slots (54).

24. An assembly as set forth in claim 17 including a top flange (68) extending radially about said sleeve (34) adjacent said sleeve top (40) and a tool flange (66) extending radially about said sleeve (34) below said top flange (68).

* * * * *